United States Patent [19]
Ramun

[11] Patent Number: 5,940,971
[45] Date of Patent: Aug. 24, 1999

[54] METAL CUTTING SHEAR WITH INNER BOLT SUPPORT FOR INDEXABLE BLADE INSERT

[75] Inventor: John R. Ramun, Poland Township, Mahoning County, Ohio

[73] Assignee: Allied Gator, Inc., Youngstown, Ohio

[21] Appl. No.: 08/824,773

[22] Filed: Mar. 26, 1997

[51] Int. Cl.⁶ .................................................. B23P 19/04
[52] U.S. Cl. ...................... 30/134; 241/101.72; 411/531
[58] Field of Search ......................... 30/134; 241/101.72, 241/101.74, 101.73; 407/77, 85; 403/292; 52/585.1; 104/106, 107, 111; 411/531, 537, 546

[56] References Cited

U.S. PATENT DOCUMENTS

| | | | |
|---|---|---|---|
| 2,901,787 | 9/1959 | Whistler et al. | 403/292 X |
| 3,115,156 | 12/1963 | Hohwart | 411/531 X |
| 3,354,526 | 11/1967 | Erkfritz | 29/96 |
| 3,490,117 | 1/1970 | Hertel | 29/96 |
| 4,403,431 | 9/1983 | Ramun et al. | 37/117.5 |
| 4,450,625 | 5/1984 | Ramun et al. | 30/134 |
| 4,519,135 | 5/1985 | LaBounty | 30/134 |
| 4,645,386 | 2/1987 | Smith | 407/113 |
| 4,670,983 | 6/1987 | Ramun et al. | 30/134 |
| 4,682,916 | 7/1987 | Briese | 407/113 |
| 4,686,767 | 8/1987 | Ramun et al. | 30/134 |
| 4,770,219 | 9/1988 | Blackwell | 144/228 |
| 4,897,921 | 2/1990 | Ramun | 30/134 |
| 4,919,573 | 4/1990 | Tsujimura et al. | 407/40 |
| 5,197,193 | 3/1993 | Smith | 30/134 |

*Primary Examiner*—Douglas D. Watts

[57] ABSTRACT

A reversible, indexable blade insert is removably secured to an anvil of a shear blade by one or more bolts through central bores in the blade insert. Each central bore includes recesses at each end which are adapted to receive a head of the bolt therein. A support member is provided within the recess of the blade insert central bore on the-inner side of the blade insert adjacent the anvil. The support member eliminates the unsupported section of the bolt in the recess, provides a positive blade insert location and increases the blade insert to anvil surface area friction.

10 Claims, 3 Drawing Sheets

METAL CUTTING SHEAR WITH INNER BOLT SUPPORT FOR INDEXABLE BLADE INSERT

BACKGROUND OF THE INVENTION

1. Field of the Invention

The present invention relates to a heavy-duty shear which is adapted to be attached to a backhoe and, more particularly, the present invention relates to a metal cutting shear with inner plow bolt supports for indexable blade inserts.

2. Background Information

Heavy-duty metal cutting shears of the type that are mounted on backhoes and powered by hydraulic cylinders for efficiently handling scrap are well known in the art. Examples of these types of shears can be found in U.S. Pat. Nos. 4,403,431; 4,450,625; 4,519,135; 4,670,983; 4,686,767; 4,897,921; and 5,197,193. These heavy-duty shears are designed for efficient handling and shearing of scrap, generally metal scrap, into usable sizes. For example, in dismantling an industrial building, metal scraps in the form of pipes of various diameters and lengths, structural beams, such as I-beams, channels, angles and the like, and sheet metal and sheet metal plate must all be efficiently handled and severed by the metal cutting shears. The metal cutting shears are additionally utilized for reducing automobile and truck frames, railroad cars and the like.

These prior art metal cutting shears typically use replaceable blade inserts having at least one cutting edge thereon. When the cutting edge of the blades is worn, the blade inserts can be removed and sharpened or replaced. U.S. Pat. No. 4,897,921 discloses the use of reversible, indexable blade inserts wherein each blade insert has multiple cutting edges thereon which can be indexed to the appropriate operative position. U.S. Pat. No. 5,197,193 discloses similar reversible blade inserts having multiple cutting edges. Typically, the blade inserts of the prior art are held in position by one or more plow bolts extending therethrough into the anvil portion of the fixed or movable blade of the shear. The blade insert is provided with a recessed portion to receive the head of the plow bolt. This attaching arrangement provides some difficulties in reversible blade inserts which are flipped to provide new cutting edges such as in U.S. Pat. Nos. 4,897,921 and 5,197,193 discussed above. These deficiencies can be clarified by reviewing the typical prior art blade insert attachment illustrated in FIG. 1. The reversible, indexable blade insert 10 includes at least one central bore 12 extending therethrough with a pair of generally frustoconically-shaped recesses 14 and 15 at opposite ends of the central bore 12. Each recess 14 and 15 has a shape corresponding to a bolt head 16 of a plow bolt 18. The outwardly facing recess 15 is adapted to receive the bolt head 16 of the plow bolt 18 therein as shown in FIG. 1. The threaded end 19 of the plow bolt 18 opposite the bolt head 16 receives a nut 20 in an anvil recess 21 to secure the blade insert 10 within an insert seat 22 of an anvil 24 of the fixed or movable blade of the shear. The inwardly facing recess 14 butts up against the anvil 24 in the insert seat 22. The inwardly facing recess 14 and the outwardly facing recess 15 will be reversed when the blade insert 10 is flipped over. The anvil 24 includes a bolt-receiving bore 25 extending from the insert seat 22 to the anvil recess 21 and is aligned with the central bore 12 to receive the plow bolt 18 therethrough. A high-collar lock washer 26 is also conventionally provided in the anvil recess 21 around the plow bolt 18 between the nut 20 and the anvil 24. This prior art configuration results in a significant unsupported section 28 along the plow bolt 18 due to the inwardly facing recess 14 adjacent the anvil 24. The unsupported section 28 is undesirable in view of the high cutting forces exerted on the blade insert 10. Additionally, the unsupported section 28 increases the likelihood of mispositioning of the blade insert 10 within the seat 22 and increases the likelihood of the blade insert 10 pulling out from the seat 22.

It is an object of the present invention to overcome the aforementioned drawbacks of the prior art. It is a further object of the present invention to provide an attachment assembly for a reversible, indexable blade insert which includes substantially complete support along the length of the plow bolts. Another object of the present invention is to provide a blade insert attachment assembly which positively locates the blade insert in the anvil seat and effectively increases the blade insert to anvil surface area to help prevent blade insert pullout.

SUMMARY OF THE INVENTION

A blade for a heavy-duty shear according to the present invention achieves the above objects. The shear blade of the present invention includes an anvil portion having at least one blade insert seat with at least one bolt-receiving bore extending from each blade insert seat. A reversible blade insert is mounted within each blade insert seat with each blade insert having at least one central bore extending therethrough aligned with one anvil bolt-receiving bore. Each blade insert central bore has a pair of recesses positioned at opposed ends thereof. A plow bolt extends through each central bore and the aligned anvil bolt-receiving bore. A head of the plow bolt is received within an outwardly facing one of the recesses of the blade insert central bore. A support member is at least partially received within the inwardly facing one of the recesses of each blade insert central bore.

The support member may be provided with a forward portion which corresponds to the configuration of the recess of the blade insert central bore. A rear portion of the support member may be substantially cylindrical and may be provided with an offset extending substantially perpendicular to the longitudinal length of the support member. The offset is positioned between the rear portion and the front portion of the support member. The support member may additionally include a bolt-receiving bore extending longitudinally therethrough. The anvil bolt-receiving bore may include a recess which at least partially receives the rear portion of the support member therein. The present invention may additionally include a shim pack positioned adjacent each support member within the anvil bolt-receiving bore.

The present invention also provides a rigid support member for a blade insert having a central bore therethrough with recesses on opposed ends of the central bore. The support member includes a body with a bolt-receiving bore extending longitudinally through the body. A front portion of the body includes an outer configuration corresponding to the shape of the recesses of the central bore.

The present invention additionally provides a heavy-duty shear which is adapted to be attached to a backhoe. The shear comprises a fixed blade, at least one reversible blade insert attached to the fixed blade, a movable blade pivotally attached to the fixed blade and at least one reversible blade insert attached to the movable blade. The blade inserts of the movable blade cooperate with the blade inserts of the fixed blade to provide a shearing action for the shear. Each blade insert includes at least one central bore extending therethrough with recesses on opposite ends of the central bore.

A bolt for each central bore extends through the central bore with a bolt head of the bolt received within one recess of the central bore. A support member is at least partially received within the other of the recesses of each central bore.

These and other advantages of the present invention will be clarified in the description of the preferred embodiments taken together with the attached figures, wherein like reference numerals represent like elements throughout.

DESCRIPTION OF THE PREFERRED EMBODIMENTS

Figure 2:
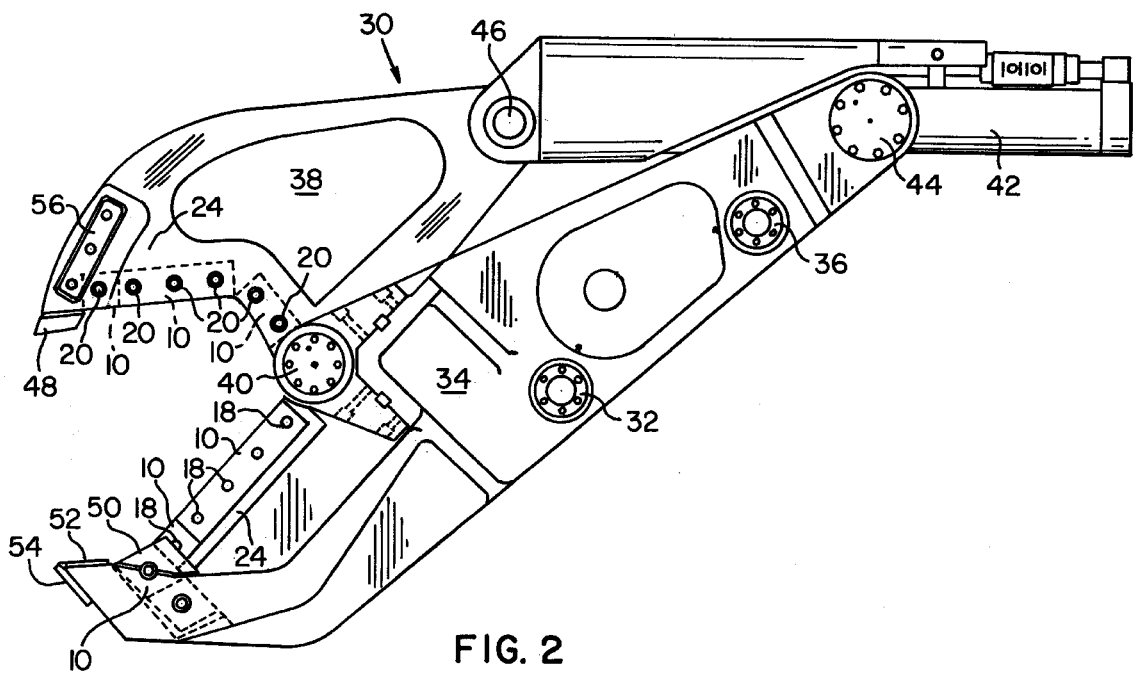
FIG. 2 is a side view of a heavy-duty shear according to the present invention.

FIG. 2 illustrates a shear 30 according to the present invention which is adapted to be attached to a backhoe boom or dipstick (not shown) by a mounting pin extending through bushing 32 on a lower fixed blade 34 of the shear 30. A second bushing 36 on the fixed blade 34 is adapted to be attached to the piston rod of the piston and cylinder assembly of the backhoe which is pivotally attached to the boom or dipstick. The piston and cylinder assembly attached to the second bushing 36 is adapted to pivot the shear 30 about the bushing 32 relative to the boom or dipstick. A movable blade 38 is pivotally attached by a thrust bearing assembly 40 to the fixed blade 34. Hydraulic cylinder assembly 42 is supported on the fixed blade 34 by bearing assembly 44. The piston rod of the hydraulic cylinder assembly 42 is attached to the movable blade 38 by pivot pin 46. Operation of hydraulic cylinder assembly 42 will move the movable blade 38 relative to the fixed blade 34 by pivoting the movable blade 38 about the thrust bearing assembly 40. Hydraulic cylinder assembly 42 and the piston and cylinder assembly attached to the second bushing 36 are controlled by the backhoe operator in a conventional fashion. The fixed blade 34 is generally formed as a pair of spaced plates forming a slot therebetween. The movable blade 38 is adapted to move through the slot closely adjacent at least one of the pair of spaced plates.

The movable blade 38 includes a plurality of reversible, indexable blade inserts 10 positioned along a side edge thereof. The blade inserts 10 are removably attached to the movable blade 38 as will be described hereinafter. Each of the blade inserts 10 includes a plurality of cutting edges along the side edges thereof. When one of the respective cutting edges of a blade insert 10 is worn down, a new cutting edge can be presented by indexing or reversing the blade insert 10 to present the new cutting edge in the operative position.

The fixed blade 34 includes a plurality of reversible, indexable blade inserts 10 removably attached to the fixed blade 34. A rectangular blade insert 10, a square blade insert 10 and a rhombus-shaped blade insert 10 are attached to the fixed blade 34 as shown in FIG. 2. The blade inserts 10 are removably attached to the fixed blade 34 in the same manner as blade inserts 10 of the movable blade 38 as will be discussed in detail hereinafter. The cutting edges of the blade inserts 10 of the movable blade 38 cooperate with the exposed cutting edges of the blade inserts 10 of the fixed blade 34 to provide a shearing action for the shear 30.

The shear 30 may further include a piercing tip 48 removably attached to the forward portion of the movable blade 38. A guide block 50 is positioned on a side of the slot in the fixed blade 34 at a position where the piercing tip 48 is adapted to extend through the slot. The guide block 50 illustrated in FIG. 2 is adjacent the rhombus-shaped blade insert 10. The shear 30 may further include wear plates 52 and 54 adjacent the forwardmost portion of the fixed blade 34 and a wear plate 56 attached to the movable blade 38 behind the piercing tip 48 on the side of the movable blade 38. The wear plates 52, 54 and 56 are positioned where significant forces tend to act on the shear 30.

Figure 3:
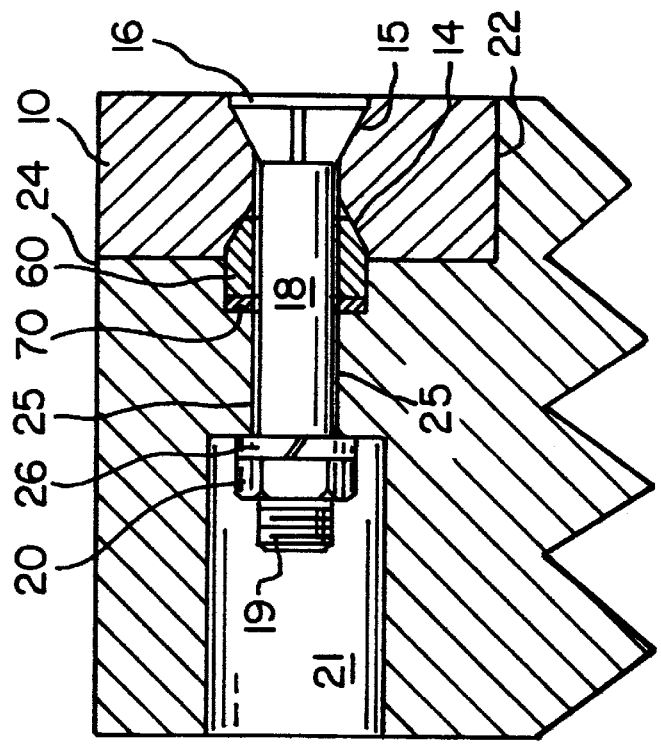
FIG. 3 is a sectional view of a blade insert attachment assembly of the heavy-duty shear illustrated in FIG. 2.
Figure 1:
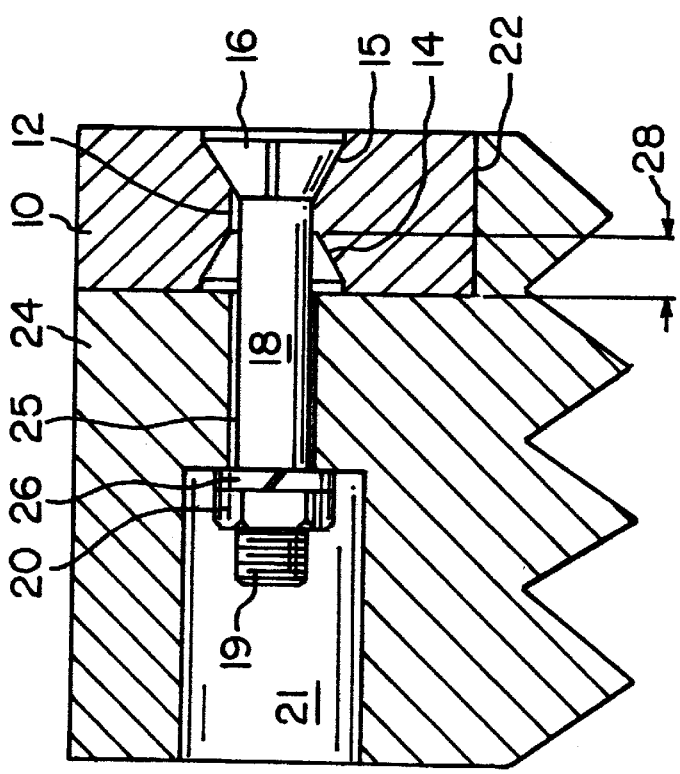
FIG. 1 is a sectional view of a blade insert attachment assembly according to the prior art.
Figure 4:
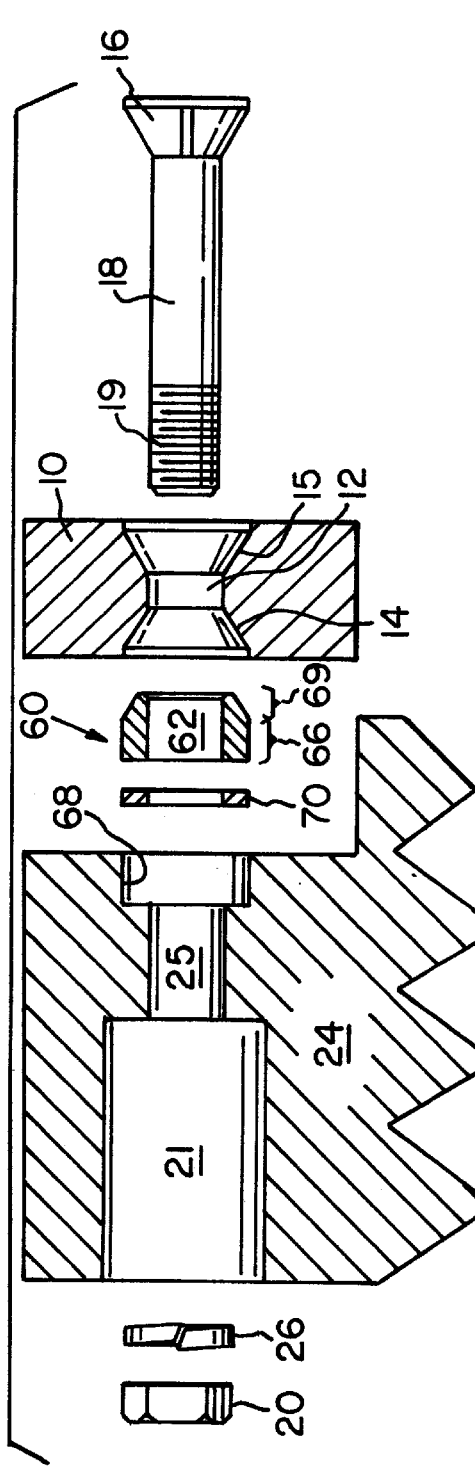
FIG. 4 is an exploded view of the blade insert attachment assembly illustrated in FIG. 3.

Each reversible, indexable blade insert 10 is mounted in a seat 22 of an anvil 24 of the fixed blade 34 or movable blade 38 by one or more plow bolts 18 extending therethrough as shown in greater detail in FIGS. 3–4. For the purposes of this application, the anvil 24 is the portion of the fixed blade 34 or the movable blade 38 to which the inserts 10 are attached. As shown in FIGS. 3–4, the plow bolt 18 extends through central bore 12 of the blade insert 10 such that the bolt head 16 is received within the outwardly facing recess 15 of the blade insert 10. The recesses 14 and 15 of the blade insert 10 are shaped to correspond to the shape of the bolt head 16. For example, the inwardly tapered frustoconical configuration of the recesses 14 and 15 shown in the figures corresponds to the frustoconical shape of the bolt head 16. Other shapes for the recesses 14 and 15 are possible corresponding to other shapes of the bolt head 16. A high-collar lock washer 26 and a nut 20 are positioned in an anvil recess 21 and threadably engage the threaded end 19 of the plow bolt 18 to secure the blade insert 10 to the anvil 24 of the fixed blade 34 or movable blade 38. An anvil bolt-receiving bore 25 extends from the seat 22 to the anvil recess 21 and is aligned with central bore 12 for receiving the plow bolt 18 therethrough. Both the central bore 12 and the anvil bolt-receiving bore 25 are shaped to correspond to the shape of the body of the plow bolt 18.

The blade insert attachment assembly of the present invention additionally includes support member 60, preferably annular in shape, surrounding the plow bolt 18 and received partially within the inwardly facing recess 14 of the blade insert 10. The support member 60 is formed of hardened steel to provide a rigid support. As best shown in FIG. 4, the support member 60 includes a central bore 62 through a body of the support member 60 for receiving the plow bolt 18. The central bore 62, like the central bore 12 and the anvil bolt-receiving bore 25, is shaped to correspond to the shape of the body of the plow bolt 18. The support member 60 includes a front portion 64 having an outer peripheral shape which is tapered corresponding to the shape of the recesses 14 and 15 of the blade insert 10 as shown in the figures. The front portion 64 may be provided with other shapes corresponding to other shapes for the recesses 14 and 15 which, in turn, correspond to the shape of the bolt head 16. The support member 60 includes a rear portion 66 having a substantially cylindrical outer peripheral shape corresponding to the shape of a support member seat 68 which is formed in the bolt-receiving bore 25 of the anvil 24. Any other shape, such as square, hexagonal, etc., may be provided for the rear portion 66 and the corresponding support member seat 68. A shim pack 70, if needed, may be positioned surrounding the plow bolt 18 in the support member seat 68 between the anvil 24 and the support member 60 to move the support member 60 forward toward the insert seat 22 by an appropriate amount. The generally annular shim pack 70 has an outer surface corresponding to the shape of the rear portion 66 and an inner bore corresponding to the shape of the central bore 62. The shim pack 70 is provided to accommodate when the blade insert 10 is sharpened resulting in a decreased width of the blade insert 10.

The support member 60 of the present invention eliminates the unsupported section 28 of the prior art to more securely hold the blade insert 10 in the anvil 24. The support member 60 can be easily positioned within the anvil 24 by chilling of the support member 60, such as by liquid nitrogen, and hammering the rear portion 66 of support member 60 into the support member seat 68. The arrangement of the present invention will provide a more positive location of the blade insert 10 than in the prior art blade insert attachment arrangement and will more efficiently transfer the load between the blade insert 10 and the anvil 24.

Pullout of the blade inserts 10 is most likely during double cutting with the rhombus-shaped blade inserts 10 being the most likely to be pulled out. The support member 60 essentially acts as a part of the anvil 24 and will also increase the blade insert 10 to the anvil 24 surface friction to help prevent pullout of the blade insert 10. The provision of the optional shim pack 70 will allow for precise location of the blade inserts 10 within the seat 22 even after sharpening of the individual blade inserts 10.

Figure 5:
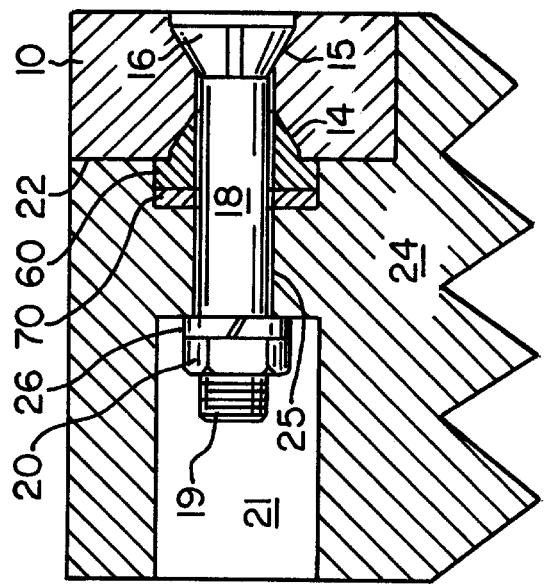
FIG. 5 is a sectional view of a modified blade insert attachment assembly of the heavy-duty shear illustrated in FIG. 1.
Figure 6:
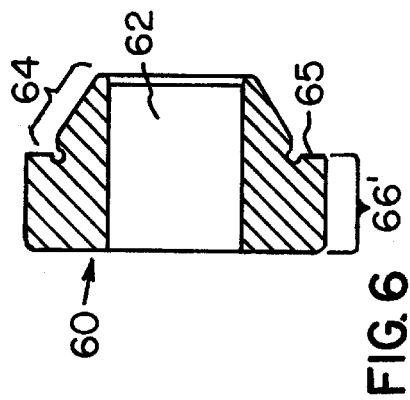
FIG. 6 is a side view of a support member of the modified blade insert attachment assembly of FIG. 5.

FIG. 5 illustrates a modified attachment assembly for the blade insert 10 according to the present invention. The modified assembly in FIG. 5 forms the rear portion 66' of the support member 60 with a larger diameter than the front portion 64 which conforms to the shape of the recesses 14 and 15. The support member 60 of the modified assembly of FIG. 5 is shown in detail in FIG. 6. This configuration provides a step or offset 65 between the rear portion 66' and the front portion 64 of the support member 60. The offset 65 extends substantially perpendicular to the longitudinal length of the support member 60. The offset 65 further serves to locate the blade insert 10 as shown in FIG. 5. In the embodiment illustrated in FIG. 5, the support member seat 68 will be sized according to the rear portion 66', and the shim pack 70 will be sized according to the support member seat 68 as shown.

It will be apparent to those of ordinary skill in the art that various modifications may be made to the present invention without departing from the spirit and scope thereof. Consequently, the scope of the present invention is intended to be defined by the appended claims.

What is claimed is:

1. A shear blade for a heavy-duty shear comprising:

an anvil portion having at least one blade insert seat and at least one bolt-receiving bore extending from each said blade insert seat;

a reversible blade insert mounted in each said blade insert seat, said blade insert having at least one central bore extending therethrough aligned with one said bolt-receiving bore of said anvil, each said central bore having a recess at each end thereof;

a bolt extending through each said central bore and said aligned bolt-receiving bore of said anvil, wherein each said bolt-receiving bore of said anvil includes a recess at least partially receiving one said support member therein and wherein a head of said bolt is received within one said recess of said central bore; and a rigid support member at least partially received within the other said recess of each said central bore.

2. The shear blade of claim 1 wherein said support member includes a forward portion having an outer configuration corresponding to a configuration of said recess of said blade insert central bore.

3. The shear blade of claim 2 wherein said forward portion of said support member is tapered along a substantial length thereof.

4. The shear blade of claim 3 wherein a rear portion of said support member is substantially cylindrical.

5. The shear blade of claim 4 wherein said support member includes a support member bolt-receiving bore extending longitudinally therethrough for receiving said bolt therethrough.

6. A shear blade for a heavy-duty shear comprising:

an anvil portion having at least one blade insert seat and at least one bolt-receiving bore extending from each said blade insert seat;

a reversible blade insert mounted in each said blade insert seat, said blade insert having at least one central bore extending therethrough aligned with one said bolt-receiving bore of said anvil, each said central bore having a recess at each end thereof;

a bolt extending through each said central bore and said aligned bolt-receiving bore of said anvil, wherein a head of said bolt is received within one said recess of said central bore; and a rigid support member at least partially received within the other said bolt-head receiving recess of each said central bore, wherein said support member includes a forward portion having an outer configuration corresponding to a configuration of said recess of said blade insert central bore, said forward portion of said support member being tapered along a substantial length thereof and a rear portion of said support member being substantially cylindrical and wherein said support member includes a support member bolt-receiving bore extending longitudinally therethrough for receiving said bolt therethrough and said support member includes an offset extending substantially perpendicular to said support member bolt-receiving bore between said rear portion and said front portion of said support member.

7. The shear blade of claim 1 wherein a rear portion of said support member is substantially cylindrical and corresponds to a shape of said recess of said anvil bolt-receiving bore.

8. The shear blade of claim 1 further including a shim pack positioned in said recess of said anvil bolt-receiving bore adjacent said support member.

9. A heavy-duty shear adapted to be attached to a backhoe, said shear comprising:

a fixed blade member;

at least one reversible blade insert attached to said fixed blade;

a movable blade pivotally attached to said fixed blade;

at least one reversible blade insert attached to said movable blade, wherein said blade inserts on said movable blade cooperate with said blade inserts on said fixed blade to provide shearing action of said shear, and wherein each said blade insert includes at least one central bore extending through said blade insert with recesses on opposite ends of said central bore;

a bolt for each said central bore extending through said central bore with a bolt head of said bolt received within one said recess of said central bore; and a rigid support member at least partially received within the other of said recesses of each said central bore, wherein each said support member includes a forward portion having an outer configuration corresponding to a configuration of said recess of said blade insert central bore, said forward portion of said support member being tapered along a substantial length thereof and a rear portion of each said support member being substantially cylindrical and wherein each said support member includes a bolt-receiving bore extending longitudinally therethrough and each said support member includes an offset extending substantially perpendicular to said bolt-receiving bore of said support member, said offset provided between said rear portion and said front portion of said support member.

10. The heavy-duty shear of claim 9 further including a shim pack positioned adjacent at least one said support member.

* * * * *